United States Patent [19]

Croft

[11] Patent Number: 5,465,562
[45] Date of Patent: Nov. 14, 1995

[54] NUT HARVESTER

[76] Inventor: W. Jack Croft, 1631 Dayton, Wichita Falls, Tex. 76301

[21] Appl. No.: 159,516

[22] Filed: Dec. 1, 1993

[51] Int. Cl.$^6$ ................................................. A01D 61/00
[52] U.S. Cl. ........................ 56/16.4 R; 56/328.1; 56/364
[58] Field of Search .............................. 56/8, 16.5, 16.4, 56/328.1, 330, 329, 364; 209/139.1, 142, 147

[56] References Cited

U.S. PATENT DOCUMENTS

| 3,182,437 | 5/1965 | Ramacher et al. | |
|---|---|---|---|
| 3,475,889 | 11/1969 | Overstreet et al. | |
| 3,591,948 | 7/1971 | Brumbaugh et al. | 56/328 R |
| 3,789,592 | 2/1974 | Croft | 56/328 R |
| 3,862,538 | 1/1975 | Henson | 56/328 R |
| 3,872,657 | 3/1975 | Ramcher et al. | 56/328 R |
| 4,524,573 | 6/1985 | Kinney | 56/330 |
| 4,982,559 | 1/1991 | Calais | 56/328.1 |
| 5,001,893 | 3/1991 | Stanley et al. | 56/328.1 |

FOREIGN PATENT DOCUMENTS 2631515  11/1989  France .

Primary Examiner—Ramon S. Britts
Assistant Examiner—Pamela A. O'Connor
Attorney, Agent, or Firm—Richard C. Litman

[57] ABSTRACT

A compact nut harvesting apparatus for collecting and separating out pecan nuts from the debris from the surface of the ground. The nuts are separated from the debris using two converging non-parallel air streams. The nuts are gleaned from the ground by a series of rotating fingers that throw the nuts and accompanying debris into a trough containing a rotating screw-shaped auger. The auger carries the nuts and debris along the trough to a side exit area. A fan blows a stream of air along the trough to help carry away some of the debris as the nuts are carried towards the exit. At the exit area, another stream of air moving upwardly from a second fan meets the debris. The debris is forced out through a chimney with a lateral air port, and the heavier nuts fall onto a conveyer located below the exit area. A series of spaced apart and slanting bars are located at the lower end of the chimney and conveyer to direct the fallen nuts towards the conveyer belt.

8 Claims, 3 Drawing Sheets

NUT HARVESTER

BACKGROUND OF THE INVENTION

1. Field of the Invention

The present invention relates to a device for the harvesting of nuts, and in particular to improvements in devices for separating and lifting the accompanying debris from the nuts during harvesting.

2. Description of the Prior Art

A great obstacle to the successful harvest of a crop, such as pecan nuts, is the gleaning and gathering of nuts that have fallen to the ground. These fallen nuts intermix with assorted ground debris and litter. Many mechanical nut pickers have been proposed in the prior art to collect the nuts while separating out the debris and litter.

U.S. Pat. No. 5,001,893 issued to Stanley et al. on Mar. 26, 1991 describes a tractor-driven harvester which uses a suction fan mounted at the center front end of the harvester. Air is drawn in through a debris separation chamber. Both the air and debris are forced through a vacuum chamber and discharged through an exhaust opening.

U.S. Pat. No. 4,982,559 issued to Calais on Jan. 8, 1985 describes a harvester which gathers nuts without using conveyers or blowers. Nuts are swept from the ground into the harvester by a rotary drum with flexible tines that sweep the ground. Debris is separated by a brush barrier as the nuts are swept in the harvester.

French Patent No. 2 631 515 issued to Armengol et al. on Nov. 24, 1989 describes a fruit harvester machine wherein a rotary brush sweeps the ground and propels fruit and attendant debris into the machine. A sieve then separates the fruit from the U.S. Pat. No. 4,524,573 issued to Kinney on Jun. 25, 1985 describes a harvester using positive air pressure to eject the gathered berries from rotating vacuum fingers to a conveyer.

U.S. Pat. No. 3,872,657 issued to Ramacher et al. on Mar. 25, 1975 describes a harvester using a stream of air to assist in lifting lighter debris from a conveyer belt. The nuts are dropped in a separator housing. The air stream is made to move upwardly in the separator housing to carry the remaining debris away as the nuts fall. The air streams are created by the same fan. The first air stream is created by the negative pressure of the fan, and the second air stream is created by the positive pressure of the fan. A flexible damper may be used to regulate the air flow to the fan.

U.S. Pat. No. 3,862,538 issued to Henson on Jan. 28, 1975 describes a harvester using an axial flow of air to remove the lighter debris from the nuts as they move from a conveyor belt to a collector bin. The debris is discharged through an exhaust duct.

U.S. Pat. No. 3,789,592 issued to the present inventor on Feb. 5, 1974 describes a self-propelled harvesting machine using a blower to remove the lighter debris from the heavier nuts as they are moved along a conveyor belt.

U.S. Pat. No. 3,591,948 issued to Brumbaugh on Jul. 13, 1971 describes a harvester in which the nuts and debris are moved along an arcuate path through an upwardly directed stream of air in a rotating perforated cylinder. Another air stream carries the debris laterally out of the open end of the cylinder.

U.S. Pat. No. 3,475,889 issued to Overstreet et al. on Nov. 4, 1969 describes a harvester where a fan blows air across the space where nuts and debris are thrown by the fingers of a rotating flipping mechanism. The nuts and some remaining debris land on a conveyer belt. Additional fans below the conveyer belt then blow the remaining debris away as the nuts are carried away and back.

U.S. Pat. No. 3,182,437 issued to Ramacher et al. on May 11, 1965 describes a harvester using a stream of air to assist in lifting lighter nuts from heavier debris off a conveyer belt. The nuts are transported with the air flow to a vertical separator where the nuts then swirl down to a conveyer.

None of the above patent references, either alone or in combination, is seen to describe the instant invention as claimed. While these and other patents disclose the use of a blower to help separate nuts and other crops from the debris in a harvesting machine, these prior art harvesters can be rather bulky and difficult to maneuver in small areas. In addition, the known prior art does not disclose or suggest the use of two converging and nonparallel air streams to separate the chaff from the nuts.

SUMMARY OF THE INVENTION

The object of the invention is to overcome the foregoing difficulties and shortcomings involved in the mechanical harvesting of nuts.

Another object of the invention is to provide a harvester that can effectively separate debris from the harvested nuts by a winnowing process.

Another object of the invention is to provide an improvement in the evacuation of chaff and other debris from the harvester.

Another object of the invention is to provide a harvester capable of being mounted to the side of a tractor for quick installation and removal.

Yet another object of the invention is to provide a harvester with a small and compact size capable of being maneuvered in close quarters.

A further object of the invention is to provide a harvester with a small and compact size and which is light enough to allow a person to manually maneuver the harvester.

To achieve the objects of the invention and in accordance with the purpose of the invention, as embodied and broadly described herein, a preferred embodiment of the invention comprises a nut harvesting apparatus comprising a sweeper for gleaning and casting nuts and debris from the ground to a trough with an auger, where the auger carries the nuts to a distal side exit; a first fan for producing a first air stream along the trough towards the distal end of the trough; a second fan for producing a second air stream in a direction which is not parallel to the first air stream at the distal side exit; and a conveyer for transporting the nuts away after they are separated from the chaff.

These and other objects of the present invention will become readily apparent upon further review of the following specification and drawings.

DETAILED DESCRIPTION OF THE PREFERRED EMBODIMENTS

Figure 1:
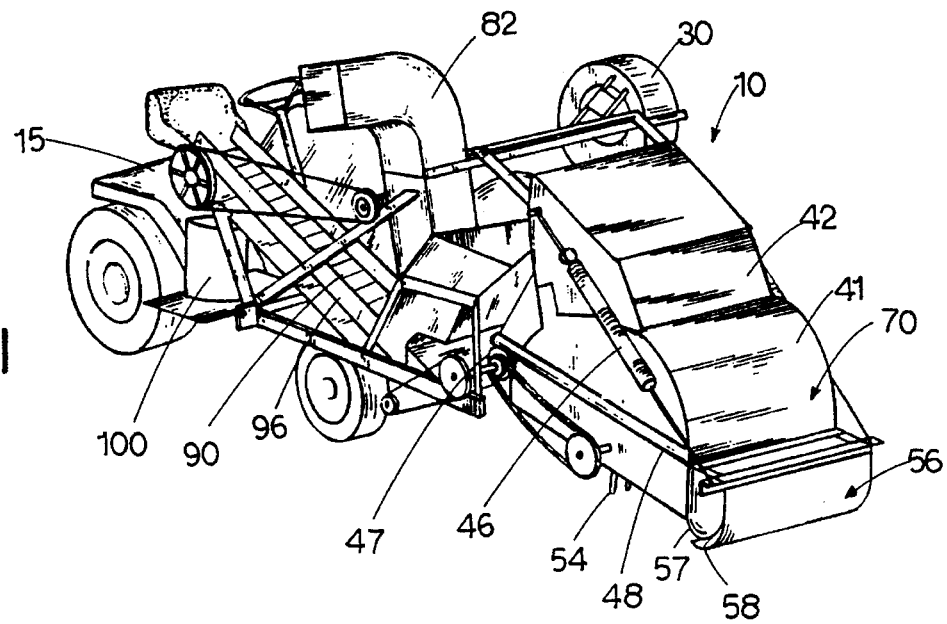
FIG. 1 is a side perspective view of the preferred embodiment of the harvester according to the present invention.

Referring now to the accompanying drawings there are illustrated several preferred embodiments of the present invention. None of the disclosed embodiments should be construed as limiting the scope of the present invention. Harvester 10 may be connected to tractor 15 for locomotion. Preferably, as shown in FIG. 1, harvester 10 is attached to the front of tractor 15. The mechanical elements of harvester 10 are driven by either a motor on harvester 10 itself, or by an angle drive connected to the tractor engine. Sweeper 50, carrier 64, and conveyer 90 are all preferably powered by a single motor. The motor may be any conventional motor, preferably a gasoline powered motor. Power from the motor is transferred to the various moving mechanisms by any conventional method such as a series of shafts, belts and pulleys, as generally shown in FIG. 1.

Figure 4:
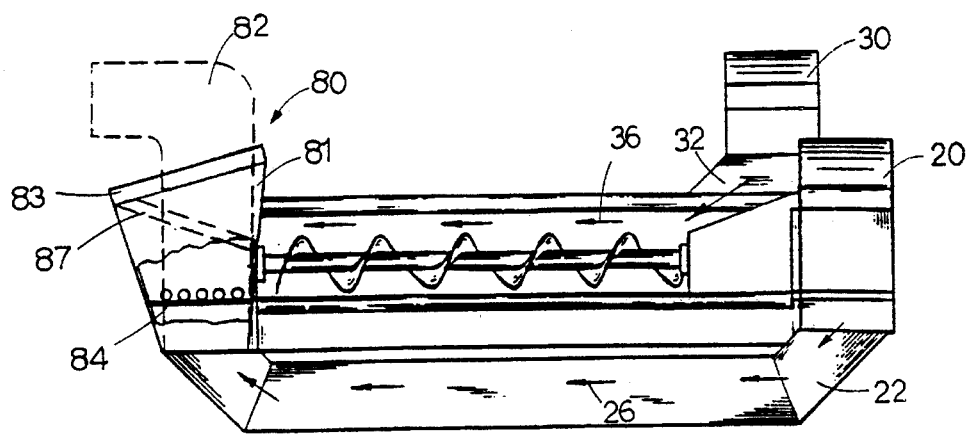
FIG. 4 is a partial, exposed front perspective view of a preferred embodiment of the present invention, including the fan and exit systems.

In a preferred embodiment of the invention, harvester 10, as shown in FIGS. 1 and 4, includes lower fan 20, upper fan 30, and front housing 40. Lower fan 20 generates an air stream that is directed towards the side exit and should produce a stronger air stream than upper fan 30. The nuts are gathered from the ground by elements contained within front housing 40.

Front housing 40 contains sweeper 50 and carrier 60. Sweeper 50 sweeps up the nuts and debris from the ground, and propels the nuts and debris back at a high velocity towards carrier 60. The inside wall of housing 40 helps guide the thrown nuts towards carrier 60. Upper fan 30 blows an air stream 36 along carrier 60 as the nuts are carried towards side exit 80. Air stream 36 begins the separation of lighter debris from the nuts as they travel along carrier 60. At side exit 80, air stream 26 from lower fan 20 meets air stream 36. Air stream 26 is upwardly moving and converges with air stream 36, where the remaining debris is separated from the nuts and all of the debris is expelled through chimney 82. The heavier nuts fall to conveyer 90 where they are to be carried to collecting bin 100. The remainder of the invention will be described in further detail below.

Figure 5:
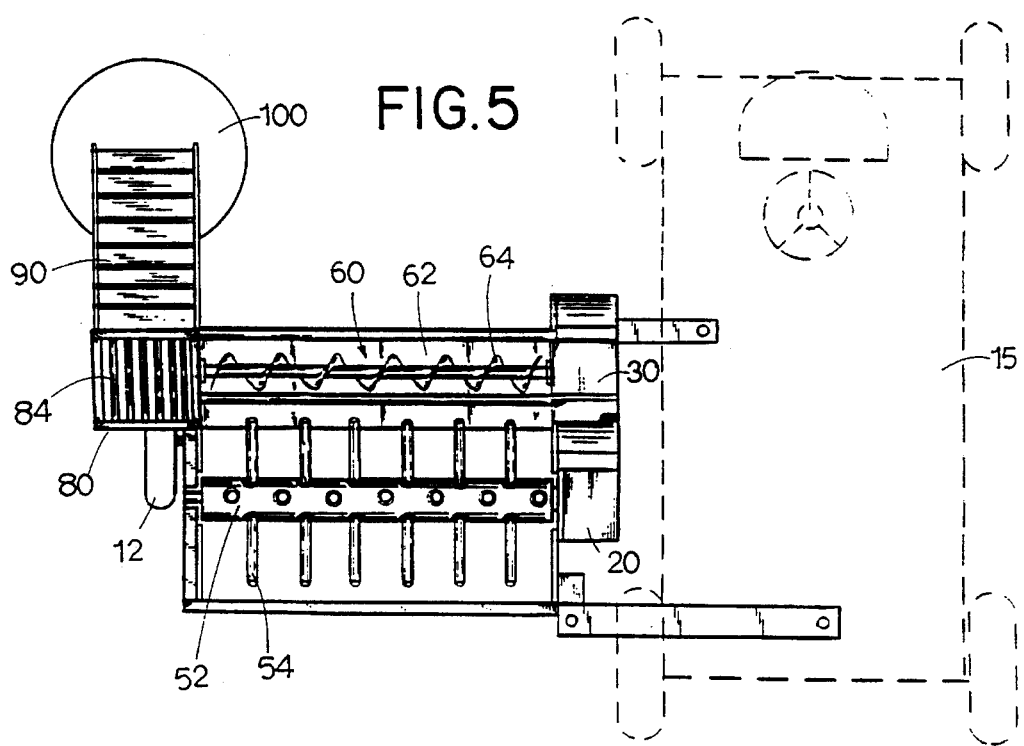
FIG. 5 is a partially exposed top view of another preferred embodiment of the harvester according to the present invention that is side-mounted to a tractor.

As shown in FIGS. 1 and 5, sweeper 50 employs rotating resilient fingers 54 to sweep the ground and lift nuts therefrom. Fingers 54 are attached to cylinder 52 which is rotated about its axis, preferably in a counterclockwise direction. Fingers 54 come into contact with the ground and rapidly propel the nuts back within housing 40. Some of the nuts may be thrown against housing hood 40 as they travel back. Housing hood 40 acts as a deflector plate to help guide the nuts to carrier 60. In addition, barrier 49 may be included between sweeper 50 and carrier 60 to prevent errant nuts and debris from damaging the interior of harvester 10. The nuts travel between the barrier 49 and hood 40 to arrive at carrier 60. Preferably, barrier 49 utilizes a rigid material such as flat belting.

Sweeper 50 further includes rolled belting skid 56 for keeping the nuts from being thrown ahead of harvester 10. Belting skid 56 keeps fingers 54 in proper contact with the ground by biasing the position of housing 40 and sweeper 50 in relation to the ground. The effectiveness of harvester 10 is diminished if sweeper 50 is improperly biased. Where sweeper 50 is positioned too far from the ground, fingers 54 will miss many of the fallen nuts. If sweeper 50 is positioned too close to the ground, then fingers 54 will begin to dig into the ground and hurl heavier debris such as dirt and rocks into harvester 10. This action can also damage resilient fingers 54 as they gouge the ground. Belting skid 56 also serves to support part of the weight of harvester 10. Rolled belting skid 56 is preferably a bowed U-shaped metal sheet 57 with a rubber sheath 58. The rubberized sheath 58 helps to absorb and cushion the forces of impact on skid 56 as harvester 10 travels along the ground. Belting skid 56 is attached to rail 47 which is mounted on pivots 48 to allow the user to set the position of sweeper 50 and belting skids 56 relative to the ground. Rail 47 is connected to a movable front portion 41 of hood 40 to raise or lower cylinder 52 and fingers 54 in relation to the topography of the ground. Upper hood 42 remains stationary. Skid 56 may also be biased by spring 46 in order to be responsive to hilly or otherwise rough terrain.

Carrier 60 catches the nuts in trough 62. Screw-shaped auger 64 rotates within trough 62. The nuts and debris are transported along trough 62 by auger 64. As the nuts and debris are being transported by auger 64, upper fan 30 produces air stream 36 through upper duct 32. Air stream 36 flows along trough 62 towards side exit 80, as shown by arrows 36 in FIG. 4. Air stream 36 begins to separate the lighter debris from the heavier nuts as they travel down carrier 60. The debris is carried along air stream 36 while the nuts continue to be transported by auger 64 to side exit 80. The air pressure along carrier 60 may be increased by incorporating a bonnet 83 to cover and close off the upper area between carrier 60 and side exit 80.

At side exit 80, the entering debris is further separated and blown away by air stream 26 from lower duct 22. Air stream 26 is produced by lower fan 20 through lower duct 22. Much of the debris is already separated and suspended in air stream 36, and air stream 26 can easily separate out and expel the remaining debris.

Figure 3:
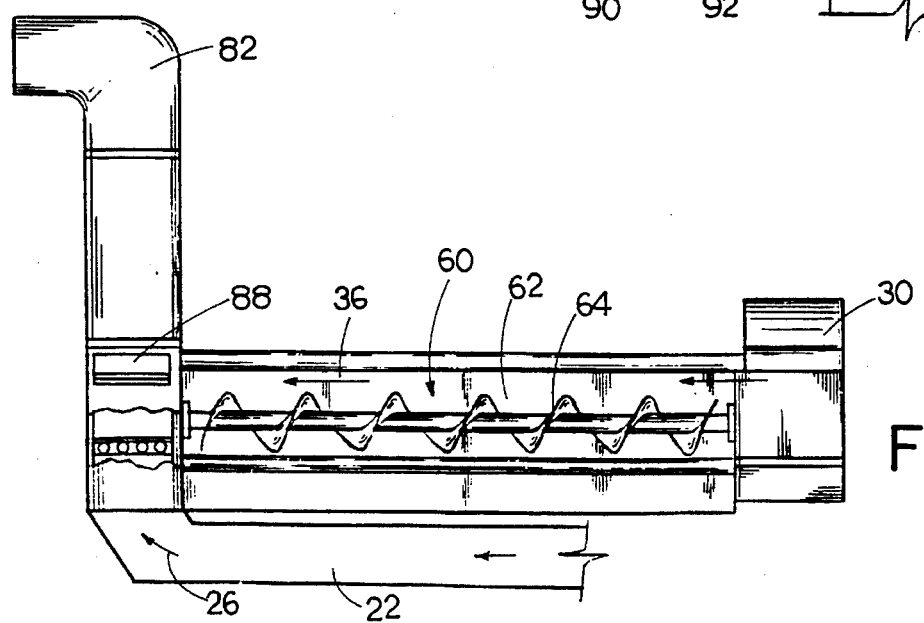
FIG. 3 is an exposed partial side view of a preferred embodiment of the chimney according to the present invention.

Side exit 80 includes vestibule 81 and chimney 82. Chimney 82 is preferably located to one side of vestibule 81. As shown in FIGS. 1 and 4, chimney 82 is located to the rear of harvester behind vestibule 81. In FIG. 3, vestibule 81 is not shown. Preferably, bonnet 83 extends into vestibule 81 to help direct air stream 36 and its accompanying debris towards chimney 82. Upwardly moving air stream 26 also preferably enters chimney 82 at a lower opening. Air stream 26 converges with the debris from air stream 36, and the debris is forced out through the upper distal open end of chimney 82. Chimney 82 includes a lateral air port 88 that leads from vestibule 81. Debris is carried by air stream 36 to chimney 81 through air port 88 where the debris then encounters upward air stream 26 and is forced out chimney 82. Lateral air port 88 aids in the efficient and rapid evacuation of debris from chimney 82 by serving to maintain proper air pressure as the debris is forced out the upper distal end of chimney 82.

Figure 2:
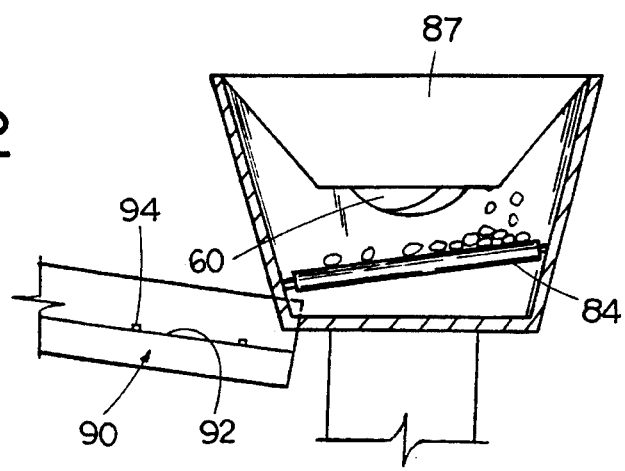
FIG. 2 is an exposed partial side view of the side exit and conveyer system according to the present invention.

Vestibule 81 preferably includes a slanted bottom 87 to intercept the nuts that become caught in air stream 36, and to allow the nuts to roll back into the open end of carrier 60. as shown in FIG. 2, slanted bottom 87 is preferably located slightly above the auger 64, thereby allowing the nuts carried by auger 64 to fall into side exit 80 and conveyer 90. The nuts fall onto a set of slanting bars 84 which are laid beneath carrier 60. Debris often accompanies these fallen nuts. Some debris may fall through the spaces between the slanting bars. Most of the debris will be caught in air stream 26 and be carried up and out through chimney 82. The nuts should be sufficiently heavy to fall through air stream 26 as they tumble along the slanting bars 84 towards conveyer 90.

A plurality of slanting bars 84 located below the slanted bottom 87 of side exit 80 and chimney 82 catches the nuts as they fall from carrier 60. Slanting bars 84 may be constructed of such material as metal, wood or plastic. The array of slanting bars 84 are aligned along a plane that is not parallel to the ground. The distal end of slanting bars 84 leads downward to conveyer 90. Slanting bars 84 are spaced sufficiently close together to prevent the nuts from falling through and between slanting bars 84, while allowing air stream 26 to move upwards to meet the nuts and debris. The nuts impact with the array of slanted bars 84 and tumble along the array of slanted bars 84 towards conveyer 90. This serves to control the descent of the nuts onto conveyer 90.

Conveyer belt 92 transports the nuts to collecting bin 100. Conveyer belt 92 includes dividers 94 for keeping the nuts roughly in place as they travel up conveyer 90. Side rails 96 prevent the nuts from falling off the sides of conveyer 90 as the nuts are delivered to collecting bin 100.

In another preferred embodiment of the present invention, as shown in FIG. 5, the harvester 10 may be mounted to the side of tractor 15 for quick assembly and removal. Front housing 40 and chimney 82 are not shown in FIG. 5 in order to provide a view of the interior configuration of the aforementioned the harvester elements. At side exit 80, only the array of slanting bars 84 leading to conveyer 90 are shown in FIG. 5. Slanting bars 84 may also extend into the lower opening of a chimney 82 as depicted in FIG. 3.

The fore and aft sections of harvester 10 are connected to the tractor by pivots and support rails. Caster wheel 12 is attached to the side of harvester 10 to improve maneuverability and stability. Caster wheel 12 serves to support and guide the side-mounted harvester 10. Aside from the position about which harvester 10 is mounted to tractor 15, the operation of harvester 10 is substantially the same as described above.

Figure 6:
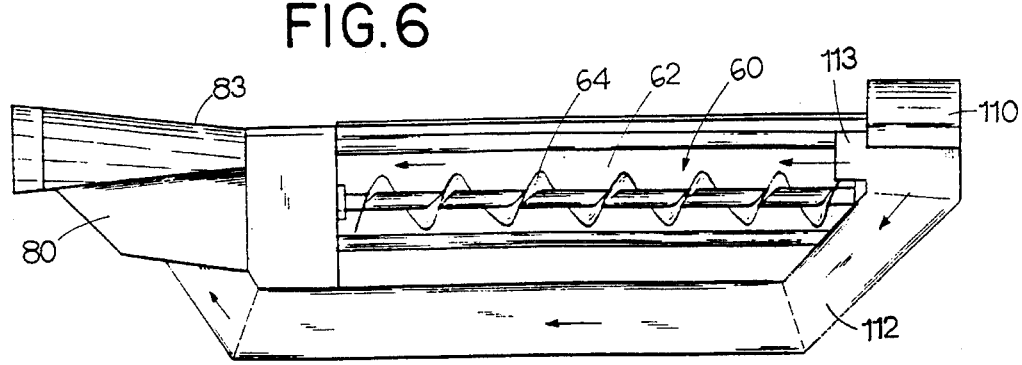
FIG. 6 is an exposed partial front view of another preferred embodiment of the harvester according to the present invention.
Figure 7:
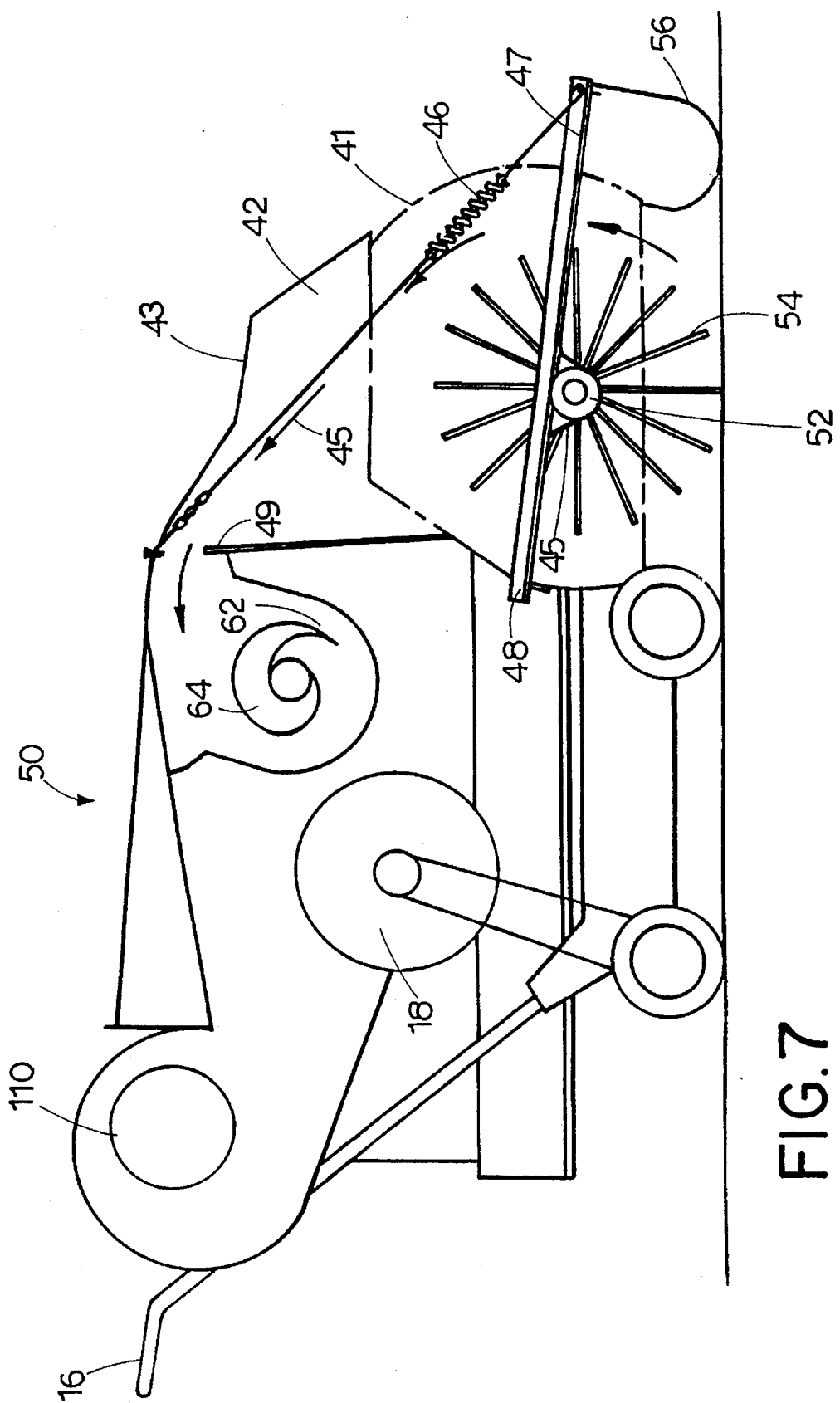
FIG. 7 is a partial exposed side view of another preferred embodiment of the harvester according to the present invention as shown in FIG. 6.

In another preferred embodiment of the present invention, as shown in FIGS. 6 and 7, harvester 10 uses only a single fan 110 with dual ducts 112 and 113. Duct 112 leads to carrier 60 and duct 113 leads to side exit 80. Duct 112 and duct 113 are analogous to ducts 22 and 32, respectively. Duct 113 conducts air stream 36 from fan 110 to carrier 60 as the nuts are carried towards side exit 80. Duct 112 conducts air stream 26 from fan 110 to side exit 80. Air streams 26 and 36, and other similar elements, denoted by the proper reference numerals, perform substantially as described earlier.

Nuts are gleaned by rotating resilient fingers 54 of sweeper 50 and are hurled backwards along the path indicated by arrows 45. The nuts and debris travel between barrier 49 and housing hood 40 to land in carrier 60. As described earlier, auger 64 carries the nuts and debris in trough 62 while duct 113 directs air stream 36 along carrier 60 to blow away the lighter debris. Auger 64 deposits the nuts through side exit 80 onto slanted bars for subsequent collection. As the nuts roll down slanted bars, air stream 36 blows away any remaining debris. Bonnet 83 increases the air pressure at side exit to facilitate the winnowing of the debris. A chimney may be included to a side of exit 80 to further direct the debris away from harvester 10.

FIG. 7 also affords an enhanced view of skids 56 and housing 40. As noted earlier, skid 56 maintains fingers 54 in proper contact with the ground. Skid 56 raises and lowers cylinder 52 and fingers 54 and movable lower housing 41 about point 48. Rail 47 is pivotally connected to the harvester at pivot 48 and fixedly connected to cylinder 52 and lower housing 41 at connecting brace 52. Skid 56 may also be welded to the bottom leading edge of housing 41. Upper housing 42 remains stationary and includes an inspection port 43 for viewing the internal mechanisms of the harvester.

The single fan configuration for harvester 10, as shown in FIGS. 6 and 7, achieves a more compact design. The reduced size and weight of harvester 10 with single fan 110 facilitates the collection of nuts in small confined areas. In a preferred embodiment of the invention with single fan 110, handles 16 are located at the rear of the harvester to allow a person to manually maneuver harvester 10 to collect nuts in close quarters. Motor 18 is preferably included on-board harvester 10 to power the various mechanical members.

It is to be understood that the present invention is not limited to the embodiments described above. It will be apparent to those skilled in the art that various modifications and variations can be made in the present invention. The present invention encompasses any and all embodiments within the scope of the following claims.

I claim:

1. A nut harvesting apparatus for harvesting nuts and separating the nuts from debris accompanying the nuts, said nut harvesting apparatus comprising:

carrying means for carrying the nuts and the debris to an exit means, said carrying means including a screw-shaped auger rotatably supported in a trough having a longitudinal axis;

sweeping means for gleaning and casting the nuts and the debris from a supporting surface into said trough;

a first fan for producing a first air stream within said trough in a direction parallel to said longitudinal axis of said trough;

a second fan for producing a second air stream within a duct, said duct having a longitudinal axis parallel to said longitudinal axis of said trough;

a vertical chimney having a proximal end and a distal end, said proximal end communicating with said exit means and said duct, said proximal end of said chimney directing said second air stream upward through said chimney, said proximal end of said chimney communicating with a conveyer means for catching and conveying away the nuts as the nuts are separated from the debris, and said distal end of said chimney being open to allow discharge of said debris; and an array of slanting bars provided in said proximal end of said chimney below said exit means, said slanting bars being sufficiently close together to prevent the nuts from falling through and between said slanting bars while allowing said second air stream to move upwards to meet the nuts and the debris, said slanting bars being sloped to guide the nuts toward said conveyer means, whereby said first and second air streams merge and propel the debris upward through said chimney while the nuts fall onto said slanting bars and are guided to said conveyer means, thus separating the nuts from the debris.

2. A nut harvesting apparatus according to claim 1, wherein the second air stream is produced in a direction substantially perpendicular to the direction of said first air stream.

3. A nut harvesting apparatus according to claim 1, wherein said sweeping means further comprises cylinder means including a plurality of spaced apart resilient finger means for garnering the nuts; and housing means for covering said cylinder means and carrying means;

wherein said cylinder means rotates said finger means to garner the nuts and debris from the supporting surface and cast the nuts and the debris towards said carrier means;

wherein said upwardly cast nuts and debris are guided by said housing means to said carrying means as the nuts and the debris are cast upwards and back.

4. A nut harvesting apparatus according to claim 3, wherein said sweeping means further comprises skid means for keeping said finger means in proper contact with the supporting surface.

5. A nut harvesting apparatus according to claim 1, wherein the nut harvesting apparatus is capable of being attached to the side of a tractor.

6. A nut harvesting apparatus for harvesting nuts and separating the nuts from debris accompanying the nuts, said nut harvesting apparatus comprising:

carrying means for carrying the nuts and the debris to an exit means, said carrying means including a screw-shaped auger rotatably supported in a trough having a longitudinal axis;

sweeping means for gleaning and casting the nuts and the debris from the supporting surface into said trough;

a fan for producing first and second air streams, said first air stream moving within said trough in a direction parallel to said longitudinal axis of said trough, and said second air stream moving within a duct, said duct having a longitudinal axis parallel to said longitudinal axis of said trough;

a vertical chimney having a proximal end and a distal end, said proximal end communicating with said exit means and said duct, said proximal end of said chimney directing said second air stream upward through said chimney, said proximal end of said chimney communicating with a conveyer means for catching and conveying away the nuts as the nuts are separated from the debris, and said distal end of said chimney being open to allow discharge of said debris; and an array of slanting bars provided in said proximal end of said chimney below said exit means, said slanting bars being sufficiently close together to prevent the nuts from falling through and between said slanting bars while allowing said second air stream to move upwards to meet the nuts and the debris, said slanting bars being sloped to guide the nuts toward said conveyer means, whereby said first and second air streams merge and propel the debris upward through said chimney while the nuts fall onto said slanting bars and are guided to said conveyer means, thus separating the nuts from the debris.

7. A nut harvesting apparatus according to claim 6, wherein said sweeping means further comprises cylinder means comprising a plurality of spaced apart resilient finger means for gleaning the nuts and the debris from the supporting surface; and housing means for covering said cylinder means and said carrying means.

8. A nut harvesting apparatus according to claim 6, wherein said sweeping means further comprises spring-biased skid means for keeping said finger means in proper contact with the supporting surface.

* * * * *